US011307889B2

(12) United States Patent
Hao et al.

(10) Patent No.: US 11,307,889 B2
(45) Date of Patent: Apr. 19, 2022

(54) SCHEDULE VIRTUAL MACHINES

(71) Applicant: International Business Machines Corporation, Armonk, NY (US)

(72) Inventors: Qing Feng Hao, Beijing (CN); Biao Cao, Beijing (CN); Li Ping Hao, Beijing (CN); Xiao Feng Ren, Beijing (CN); Dong Yan Yang, Beijing (CN); YaLian Pan, Beijing (CN); Xue Yong Zhang, Beijing (CN); Xi Qian, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 93 days.

(21) Appl. No.: 16/885,609

(22) Filed: May 28, 2020

(65) Prior Publication Data
US 2021/0373925 A1 Dec. 2, 2021

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4881* (2013.01); *G06F 9/5077* (2013.01); *G06F 2009/4557* (2013.01); *G06F 2009/45575* (2013.01); *G06F 2009/45595* (2013.01)

(58) Field of Classification Search
CPC .. G06F 9/45558; G06F 9/4881; G06F 9/5077; G06F 2009/4557; G06F 2009/45575; G06F 2009/45595
See application file for complete search history.

(56) References Cited

U.S. PATENT DOCUMENTS

| 8,825,863 | B2 | 9/2014 | Hansson et al. | |
|---|---|---|---|---|
| 2007/0271560 | A1 | 11/2007 | Wahlert et al. | |
| 2010/0058342 | A1* | 3/2010 | Machida | G06F 9/5077 718/1 |
| 2013/0097601 | A1* | 4/2013 | Podvratnik | G06F 8/61 718/1 |
| 2013/0111468 | A1 | 5/2013 | Davis et al. | |

(Continued)

FOREIGN PATENT DOCUMENTS

CN 103970607 A 8/2014

OTHER PUBLICATIONS

Mell, P. et al., "The NIST Definition of Cloud Computing: Recommendations of the National Institute of Standards and Technology," National Institute of Standards and Technology, U.S. Department of Commerce, Special Publication 800-145, Sep. 2011, 7 pages.

(Continued)

*Primary Examiner* — Dong U Kim
(74) *Attorney, Agent, or Firm* — Cantor Colburn LLP; Teddi Maranzano

(57) ABSTRACT

Techniques for virtual machines include receiving virtual machine (VM) requests, and finding one or more VM requests of the VM requests that optimize available resources of a candidate host machine while seeking to minimize differences between the one or more VM requests and the candidate host machine. The one or more VM requests are allocated to the candidate host machine.

18 Claims, 11 Drawing Sheets

(56) References Cited

U.S. PATENT DOCUMENTS

| | | | |
|---|---|---|---|
| 2013/0297964 A1* | 11/2013 | Hegdal | G06F 11/0712 |
| | | | 714/2 |
| 2015/0355892 A1* | 12/2015 | Glikson | G06F 9/45558 |
| | | | 718/1 |
| 2017/0054606 A1 | 2/2017 | Cropper et al. | |
| 2017/0139729 A1* | 5/2017 | Cropper | G06F 9/45558 |
| 2017/0149687 A1* | 5/2017 | Udupi | H04L 47/78 |
| 2018/0225137 A1* | 8/2018 | Bianchini | G06F 9/5083 |
| 2018/0225149 A1* | 8/2018 | Bianchini | G06F 9/5016 |
| 2019/0245757 A1* | 8/2019 | Meyer | G06F 9/5072 |
| 2019/0310881 A1 | 10/2019 | Gupta et al. | |

OTHER PUBLICATIONS

Seddigh, M. et al., "Dynamic prediction scheduling for virtual machine placement via ant colony optimization," Dec. 16-17, 2015, Signal Processing and Intelligent Systems Conference (SPIS), 5 pages.

* cited by examiner

SCHEDULE VIRTUAL MACHINES

BACKGROUND

The present invention generally relates to computer systems, and more specifically, to scheduling virtual machines efficiently and precisely on computer systems.

The term "virtualization" encompasses creating and running a simulated computer environment, for example, a virtual machine, on a hardware or software platform. The simulated computer environment may include a software system, for example, operating system, that hosts one or more applications. Such virtual machines may be configured to simulate physical computers with various capabilities and capacities, such as computing power, architecture, memory, etc.

A computing environment may have a large number of physical machines that can each host one or more virtual machines. Management tools allow a system administrator to assist in determining a specific physical host in which to place or deploy a new virtual machine. After deployment, the management tools can move one or more virtual machines to a different physical host.

SUMMARY

Embodiments of the present invention are directed to scheduling virtual machines efficiently and precisely. A non-limiting example computer-implemented method includes receiving virtual machine (VM) requests, and finding one or more VM requests of the VM requests that optimize available resources of a candidate host machine while seeking to minimize differences between the one or more VM requests and the candidate host machine. Also, the computer-implemented method includes allocating the one or more VM requests to the candidate host machine.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide a system and method to schedule virtual machines (VMs) efficiently and precisely. One or more embodiments can use a smart virtual machine scheduler (SVS) to schedule VMs to the proper host machine with best resource usage and reclaim the resources when requested. SVS may include a request assembler (RA), resource arbitrator (RT), VM dispatcher (VD), and resource reclaimer (RR). SVS can smartly combine the VM requests for efficient deployment on a host machine. When scheduling VMs to a host machine, often a resource fragment can subsequently occur on the host machine. A resource fragment is when a single host machine does not contain all available types of resources to meet a minimum/baseline VM request because that host machine has one type of resource available but another type of resource is unavailable, thereby causing the available types of resources on the host machines go to unused because of the inability to have a minimum amount of all types of resources. As an example, after deployment of VMs on host A and host B, there can 4 CPU (central processing units) left on host A with 0 RAM (random access memory), and 4G (gigabytes) RAM left on host B with 0 CPU; if the user wants to launch a VM of 4 CPUs and 4G memory (i.e., RAM), the request will fail although the overall resource can be met by the hosts A and B. Although one could schedule the VM to another available host, or manually migrate the VM to free some resource if possible, these options present some shortcomings. For example, there would be resource waste, it would be difficult for the administrator to define what VMs to migrate for a best resource usage, and there would be a performance impact on the normal workload. According to one or more embodiments of the invention, SVS is configured to schedule the VM to the proper host to obtain a best resource usage, to smartly combine VM requests to obtain a best resource usage, provide a good resource ratio, and reclaim the host's resources efficiently with precise VM migration.

Figure 1:
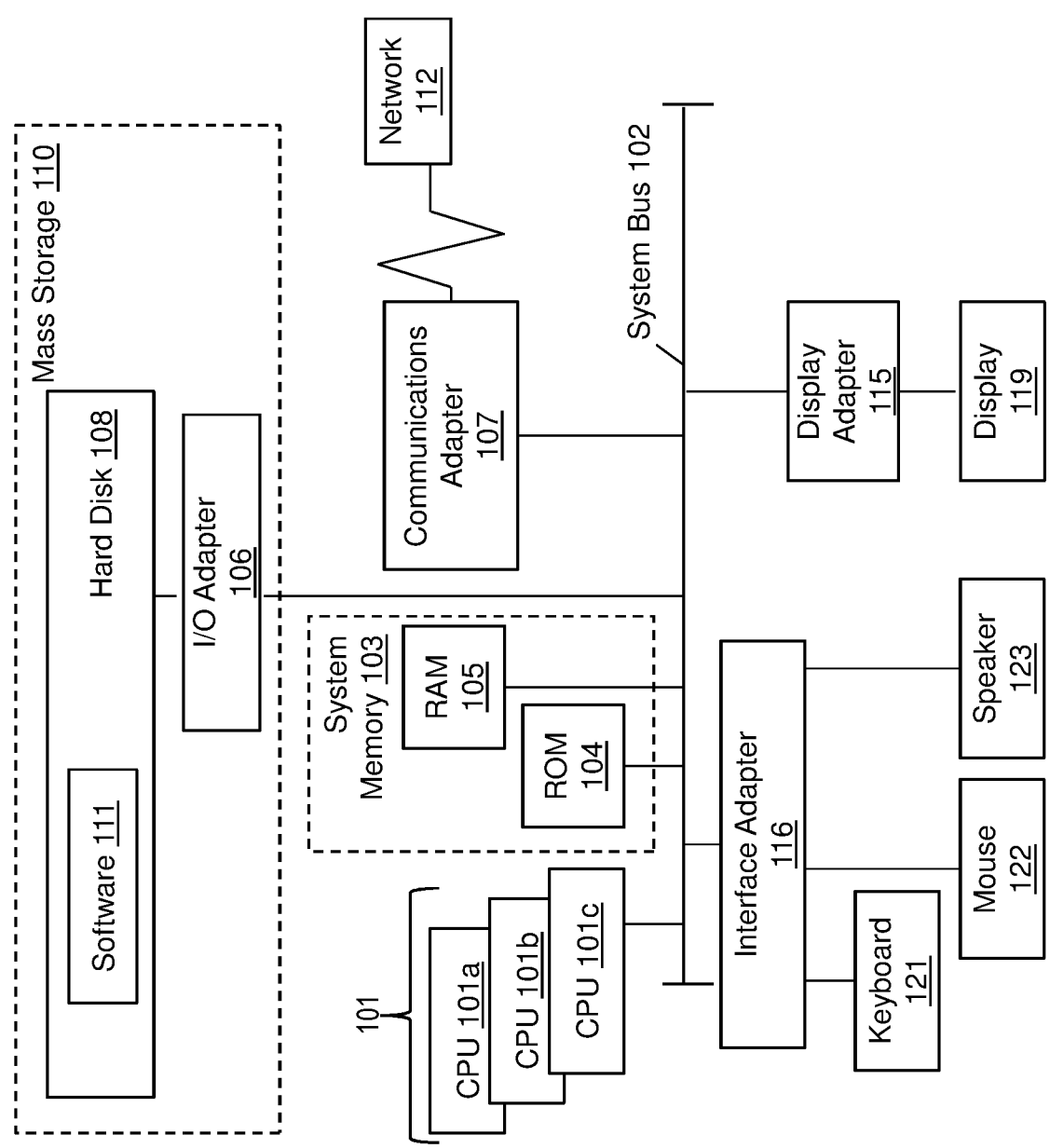
FIG. 1 is a block diagram of an example computer system for use in conjunction with one or more embodiments.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
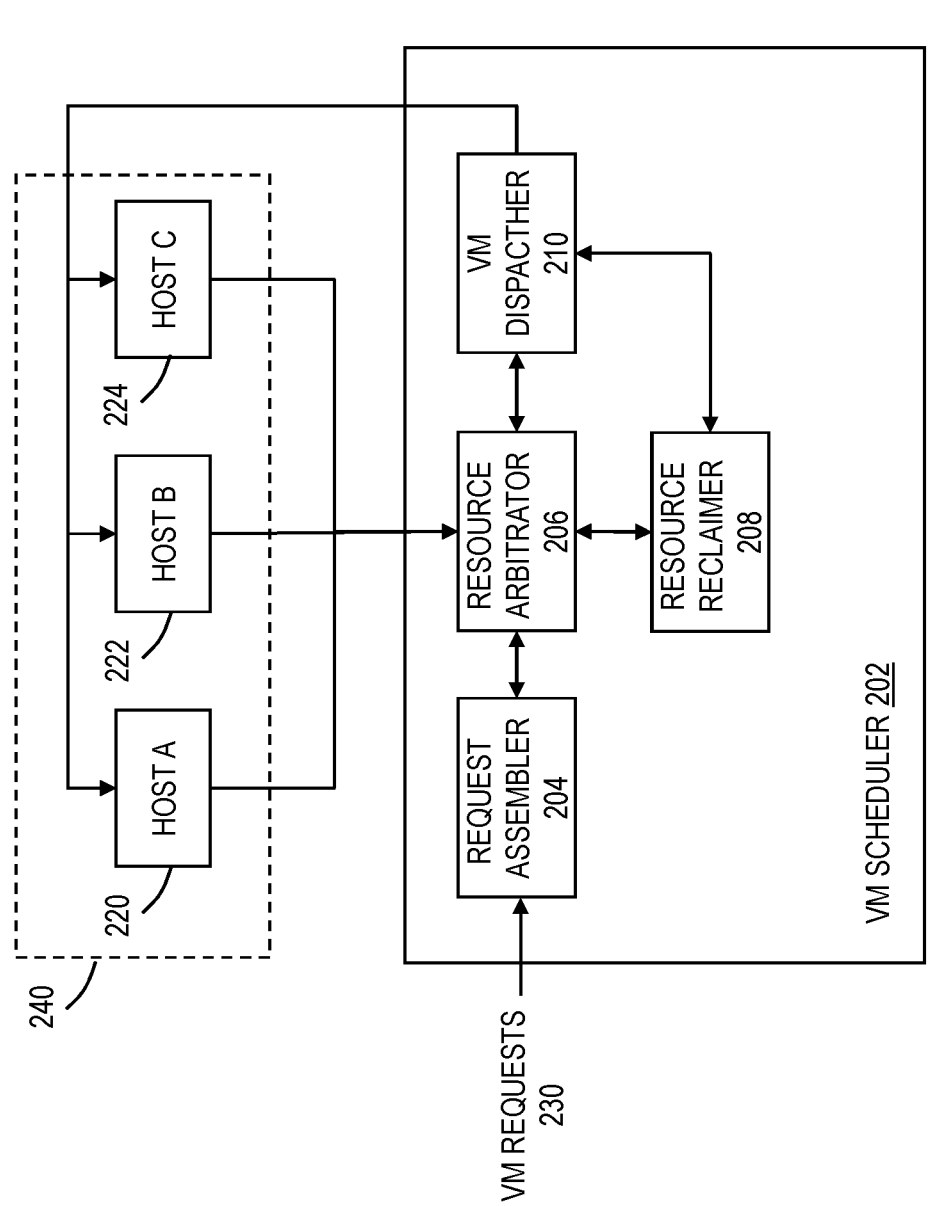
FIG. 2 is a block diagram of a system for scheduling virtual machines in accordance with one or more embodiments of the present invention.

FIG. 2 is a block diagram of a system 200 for scheduling virtual machines (VM) in accordance with one or more embodiments of the present invention. System 200 includes smart VM scheduler (SVS) 202, which may include request assembler (RA) 204, resource arbitrator (RT) 206, VM dispatcher (VD) 210, and resource reclaimer (RR) 208. SVS 202 is configured to schedule VM requests 230 to run or be deployed on the proper host machines 240 with best resource usage and reclaim resources when requested. In system 200, SVS 202, RA 204, RT 206, VD 210, and RR 208 may be implemented in conjunction with any appropriate computer system, such as one or more computer systems 100 of FIG. 1. Embodiments of methods and techniques may be implemented in software 111 and may operate on data stored in mass storage 110 and/or system memory 103. Host machines 240 may be implemented in conjunction with any appropriate computer system, such as computer systems 100 of FIG. 1. Resources of host machines 240, also referred to as hosts, can include central processing unit (CPU), random access memory (RAM), hard disk (DISK), bandwidth utilization, etc. For illustration purposes, host machines 240 are depicted as host machines 220, 222, 224 respectively for hosts A, B, C. It should be appreciated that although only three host machines are illustrated in FIG. 2, there can be more or fewer host machines.

SVS 202 is configured to receive VM requests 230 from a computer system which is typically a remote computer system. Each VM request is a request to run/deploy a VM on a host machine 240. RA 204 combines irregular VM requests, regular VM requests, and/or combinations of both irregular and regular VM requests to improve resource utilization of resources on host machines 240.

RT 206 determines which host machine 240 best fits the VM with the minimal 'variance' of the resources, which is the minimal variance between requested resources of the VM request and available resource of the host machine. Once the host machine is determined by RT, VD 210 applies the VM request to the host machine meeting the criteria of the minimal variance. The best fit host will result in no wasted resource fragment (in a best case scenario). Each VM request (resulting in a deployed VM) requires a certain amount of each type of the resources to operate, for example, an amount of CPU, RAM, and DISK. A resource fragment on a host machine is when the host machine has at least one type of resource available (i.e., unused) while not having another type of resource available (i.e., no more capacity for the other type of resource); as such, this host machine can never host/meet a future VM (i.e., cannot fulfill a future VM request) in this condition, although the host machine has at least one type of resource available. If there are several host machines whose host_res_ratio=vm_res_ratio (i.e., host resource ratio equals VM resource ratio), the RT 206 can choose one of the hosts that matches the VM request (to generate a VM image) which provides better performance.

Resources available on a host machine change over time. This change in available resources can be intentionally made at runtime by an administrator or by programs unintentionally. As a result of the change, available resources of the host machine may not be the best fit for the VMs currently running on the host machine. At this time, RR 208 is launched to redistribute the VMs on the host machine with other host machines (i.e., with VMs on other host machines) in order to obtain the best resource usage which maintains a minimal variance.

Figure 3:
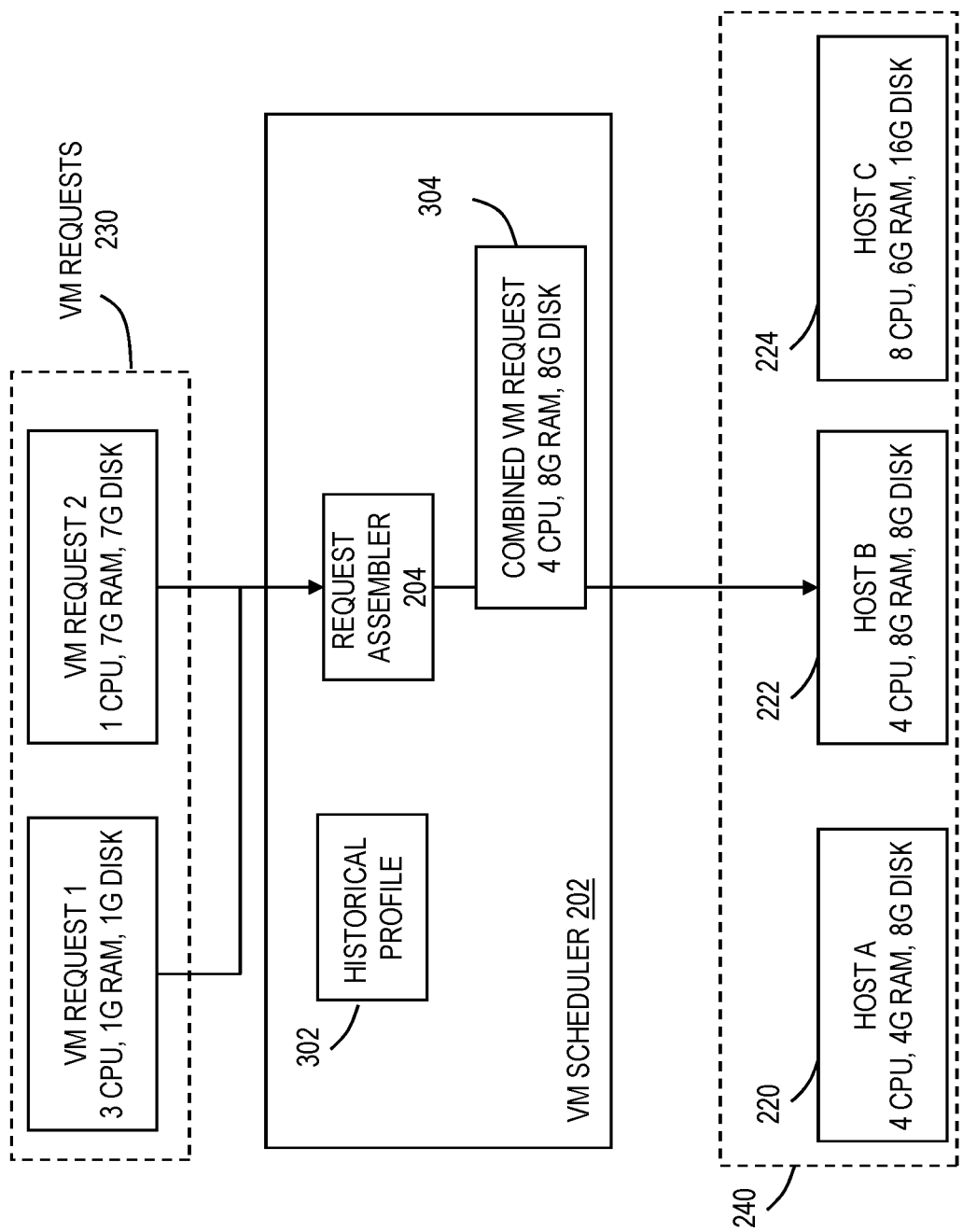
FIG. 3 is a block diagram illustrating an example of scheduling virtual machines using the system in accordance with one or more embodiments of the present invention.

FIG. 3 is a block diagram of using system 200 for scheduling virtual machines in accordance with one or more embodiments of the present invention. FIG. 3 illustrates an example scenario using SVS 202 to combine irregular VM requests as discussed further below. It should be appreciated that an abbreviated view of system 200 is shown for conciseness, and system 200 includes all features discussed herein. In the example scenario of FIG. 3, SVS 202 receives two VM requests 230, which are illustrated as VM request 1 and VM request 2. The RA 204 is configured to determine that each of VM requests 1 and 2 is an irregular VM request based on a historical profile 302. Historical profile 302 can be in and/or coupled to memory such as memory in computer system 100. Historical profile 302 includes a baseline VM request that contains baseline for each type of resource, such as a baseline CPU, baseline RAM, and baseline DISK. Baseline VM request can have a variance scope and/or a tolerance associated with its baseline CPU, baseline RAM, and baseline DISK. Accordingly, baseline VM request includes a baseline value for each type of resource in the baseline VM request. For example, baseline VM request can include a baseline CPU value, baseline RAM value, and baseline DISK value, along with any other baseline values associated with baseline VM request. SVS 202 could determine baseline VM request according to an average of past VM requests received by SVS 202 over a predefined period of time. Also, baseline VM request could be set by an administrator/operator using an input device such as a keyboard, mouse, joystick, etc., of computer system 100. Historical profile 302 can also include a baseline host machine, which defines a baseline or average value for available resources of each type on the host machine. Additionally, baseline VM request could be the VM requests that have a minimal variance of the resources e.g. CPU, RAM, DISK with the baseline host machine.

Continuing the example scenario in FIG. 3, RA 204 is configured to identify VM request 1 and VM request 2 as irregular VM requests by comparing each to the baseline VM request in historical profile 302. For example, RA 204 respectively compares each type of resource in baseline VM request to its counterpart requested resource in the VM request (e.g., VM request 1), and when at least one type of resource of the VM request (e.g., VM request 1) differs from baseline VM request by more than the variance tolerance and/or when a ratio of types of resources (e.g., CPU/RAM/DISK) differs from the ratio (e.g., CPU/RAM/DISK) of baseline VM request by more than the variance tolerance, RA 204 identifies this VM request as an irregular VM request because it is outside of the variance tolerance. In historical profile 302, each type of resource, such as CPU, RAM, DISK, etc., can have its own tolerance in one or more embodiments. In one or more embodiments, tolerance can be 0 for one or more types of resources. In one or more embodiments, an irregular VM request is identified when the VM request has a variance/difference in value from baseline VM request for at least one type of resource and when the variance/difference is greater than a defined ratio of the maximal variance/difference in the historical VM requests. The maximal variance/difference can be the maximal variance/difference of resources (e.g., CPU/RAM/DISK) between the historical VM requests and the baseline VM request.

Continuing the example scenario of FIG. 3, VM request 1 is a request for 3 CPU, 1G RAM, 1G DISK and VM request 2 is a request for 1 CPU, 7G RAM, 7G DISK. After determining that VM requests 1 and 2 are both irregular VM requests based on the VM requests 1 and 2 each differing from baseline VM request (which can be a resource ratio comparison) by more than the tolerance (i.e., a threshold), RA 204 is configured to combine VM requests 1 and 2 into a combined VM request 304. Combined VM request 304 is now a request for 4 CPU, 8G RAM, and 8G DISK. When there are multiple irregular VM requests (e.g., 2, 3, 4, 5, or more), RA 204 finds a combination of two or more irregular VM requests that best fits available resources of current host machines 240, which are candidate host machines having resources available to meet the VM request(s). For example, SVS 202 may use a best fit algorithm or procedure with the objective of having no wasted resource fragment left on the host machine and/or completely using the available resources on the host machine such that each type of resource is used to capacity, thereby having a minimal variance. As noted herein, a resource fragment is when a host machine has zero (0) capacity for at least one type of resource (e.g., CPU is completely used/full to capacity) but still has available resource availability for another type of resource (e.g., RAM is available and/or DISK is available), thereby resulting in a situation where the host machine cannot meet a future baseline VM request. The future baseline VM request is predefined in, for example, historical profile 302, as a request for some amount of CPU, RAM, DISK. One or more embodiments avoid/prevent the case where there are resource fragments left one or many host machines, resulting in unused types of resources and inefficient allocation of VMs, assuming that requested resources of each VM request is to be on a single host machine and not distributed. In other words, it may be assumed that a VM request is to be fulfilled by and/or deployed on a single host machine. By comparing the requested resources in combined VM request 304 per type of resource to available resources in each of the host machines 240 per type, SVS 202 determines that Host B (e.g., host machine 222) meets the requested resources in combined VM request 304 in FIG. 3 with a minimal variance. In this case, the requested resources and available resources are a complete match, with no capacity remaining for any type of resource in Host B (e.g., host machine 222). Although FIG. 3 illustrates combining two irregular VM requests, SVS 202 can combine any type of VM requests, such as an one or more irregular VM requests combined with one or more regular VM requests, one or more regular VM requests combined with one or more regular VM requests, and/or one or more irregular VM requests combined one or more irregular VM requests, in order to find a best fit to candidate host machines with minimal variance (i.e., no resource fragments and no waste).

There can be various ways to categorize irregular VM requests, and further regarding combining irregular VM requests is provided below. As noted above, irregular VM requests are identified by RA 204. This may be accomplished according to the variance of the historical VM requests and the available resources of a host machine. For example, as one option, RA 204 can set a regular VM request in as the average (e.g., baseline VM request) with a reasonable variance scope, where irregular VM requests are not in this scope which have a variance larger than a defined ratio of the maximal variance. The maximal variance/difference can be the maximal variance/difference of resources (e.g., CPU/RAM/DISK) between the historical VM requests and the baseline VM request. As one example, RA 204 can categorize irregular VM requests by modeling them. For example, RA 204 is configured to set one type of resource in the irregular VM request as the normal baseline, relative to which all the other types of resources in the irregular VM request are set. For example, setting CPU as baseline resource, then the CPU resource in the irregular VM request is always normal and at least one resource of e.g., RAM and DISK in this irregular VM request is abnormal. What kind of 'abnormal' can be determined by calculating the ratio between this irregular VM request and baseline regular VM request. For example, the average ratio of the (normal) baseline VM requests is 2CPU, 4G RAM, and 8G DISK, and then an irregular VM request of 4 CPU, 6G RAM, and 8G DISK is a request of less RAM. Using the ratio of CPU/RAM/DISK, baseline VM request has the ratio 2/4/8 which can be reduced (by dividing by 2) to a ratio of 1/2/4, while the irregular VM request has the CPU/RAM/DISK ratio of 4/6/8 which can be reduced (by also dividing by 2) to a ratio of 2/3/4. If it is assumed that CPU is set as the baseline resource, to make the CPU equivalent in both ratios for baseline VM request and irregular VM request, then the ratio of baseline VM request needs to be multiplied by 2 thereby equaling 2 CPU. If the baseline VM request has 2 CPU (like the reduced ratio of irregular VM request), then the baseline VM request would require 4 RAM and 8 DISK, but the reduced ratio of irregular VM request having 2 CPU only requires 3 RAM and 4 DISK, which is less RAM and less DISK than the baseline VM request, thereby identifying the irregular VM request as being irregular. According to one or more embodiments, an additional way to check and determine which kind of resource in the irregular VM request is more or less is through comparing the ratios, i.e., the average baseline VM request ratio of RAM/CPU (e.g., called b1) is 4/2=2, ratio of DISK/CPU (e.g., called b2) is 8/2=4, while the (sampled) irregular VM request ratio of RAM/CPU (e.g., called r1) is 6/4=1.5, ratio of DISK/CPU (called r2) is 8/4=2; since r1<b1, RAM in the irregular VM request is less, and since r2<b2, DISK in the irregular VM request is less, and vice versa. For any resource in an irregular VM request, 0 represents normal (i.e., normal amount and ratio of a type of resource), −1 represents less (i.e., less than normal amount and ratio of a type of resource), 1 represents more (i.e., more than normal amount and ratio of a type of resource), and accordingly, the sample irregular VM request above can be expressed as (0, −1, −1), which denotes the relationship (CPU, RAM, DISK). With this, all the irregular VM requests of resources (CPU, RAM, DISK) can be expressed in the following eight kinds of relationships given that the first type of resource is always normal (e.g., CPU): (0, 0, −1), (0, 0, 1), (0, −1, 0), (0, −1, −1), (0, −1, 1), (0, 1, 0), (0, 1, −1), (0, 1, 1). Although some examples may illustrate resources for CPU, RAM, DISK, one or more embodiments can define and/or include more than three resources in the VM request, such as, for example, the expression for four resources (CPU, RAM, DISK, Bandwidth) having an example relationship (0, −1, 1, −1), which analogously follows the description for three resources discussed herein. It can still be assumed that that CPU is set as the baseline resource.

There can be various ways to define rules for combining irregular VM requests. For example, RA 204 is configured to pre-calculate and store in memory the rules on how to combine the eight kinds of irregular VM requests with all types of combinations including pairs, triplet, quadruplets, and so on. In one or more embodiments, these rules may be called "Irregular Requests Combination Rules", which can have 23 rules in total. The rules are that the sum of all the elements in the set should be (0, 0, 0). The following is an example list for the 23 rules for three types of resources (although a set could have more than three types of resources):

Assuming a=(0, 0, −1), b=(0, 0, 1), c=(0, −1, 0), d=(0, 1, 0), e=(0, −1, 1), f=(0, 1, −1), g=(0, −1, −1), h=(0, 1, 1), then there are 4 rules of pairs: [a, b], [c, d], [e, f], [g, h] (because a+b=(0, 0, 0), c+d=(0, 0, 0) and so on), 4 rules of triplet: [a, c, h], [a, d, e], [b, d, g], [b, c, f] (because a+c+h=(0, 0, 0) and so on), 6 rules of quadruplets: [a, b, c, d], [a, b, e, f], [a, b, g, h], [c, d, e, f], [c, d, g, h], [e, f, g, h], 4 rules of quintuplet: [a, c, e, f, h], [a, d, e, g, h], [b, c, f, g, h], [b, d, e, f, g], 4 rules of sextuplet: [a, b, c, d, e, f], [a, b, c, d, g, h], [a, b, e, f, g, h], [c, d, e, f, g, h], 0 rules of septuplet, and 1 rule of octuplet: [a, b, c, d, e, f, g, h]. RA 204 is configured to combine irregular VM requests according to the rules. The way to combine is flexible and not limited except for by the best host's resource availability. For example, RA 204 is configured to combine irregular VM requests recursively (going through all and/or nearly all combinations) in a manner that combines the maximum number of irregular VM requests until all the irregular VM requests are combined and/or until any irregular VM requests can no longer be combined (e.g., without exceeding available resources of a candidate host machines). Additionally, RA 204 can be configured combine a minimal number of irregular VM requests and/or use other policies.

Further regarding use of minimal variance is discussed. According to one or more embodiments, the minimal variance algorithm of SVS 202 is a global optimization. The minimal variance algorithm is not to find the host machine having the maximum resource capacity or exhaust one resource (one type of resource) of the host machine, but to allocate resources on the host machine most optimally. The minimal variance algorithm of SVS 202 finds the globally best-matched host machine among all the host machines, and considers not only the current VM request (which can be a combination of VM requests), but also the possibility of future baseline VM request. The minimal variance algorithm of SVS 202 accounts for the possibility to best-fit the future baseline VM request, gives a global optimum across all types of resources for each of the host machines, and avoids resource fragments and waste.

Figure 4:
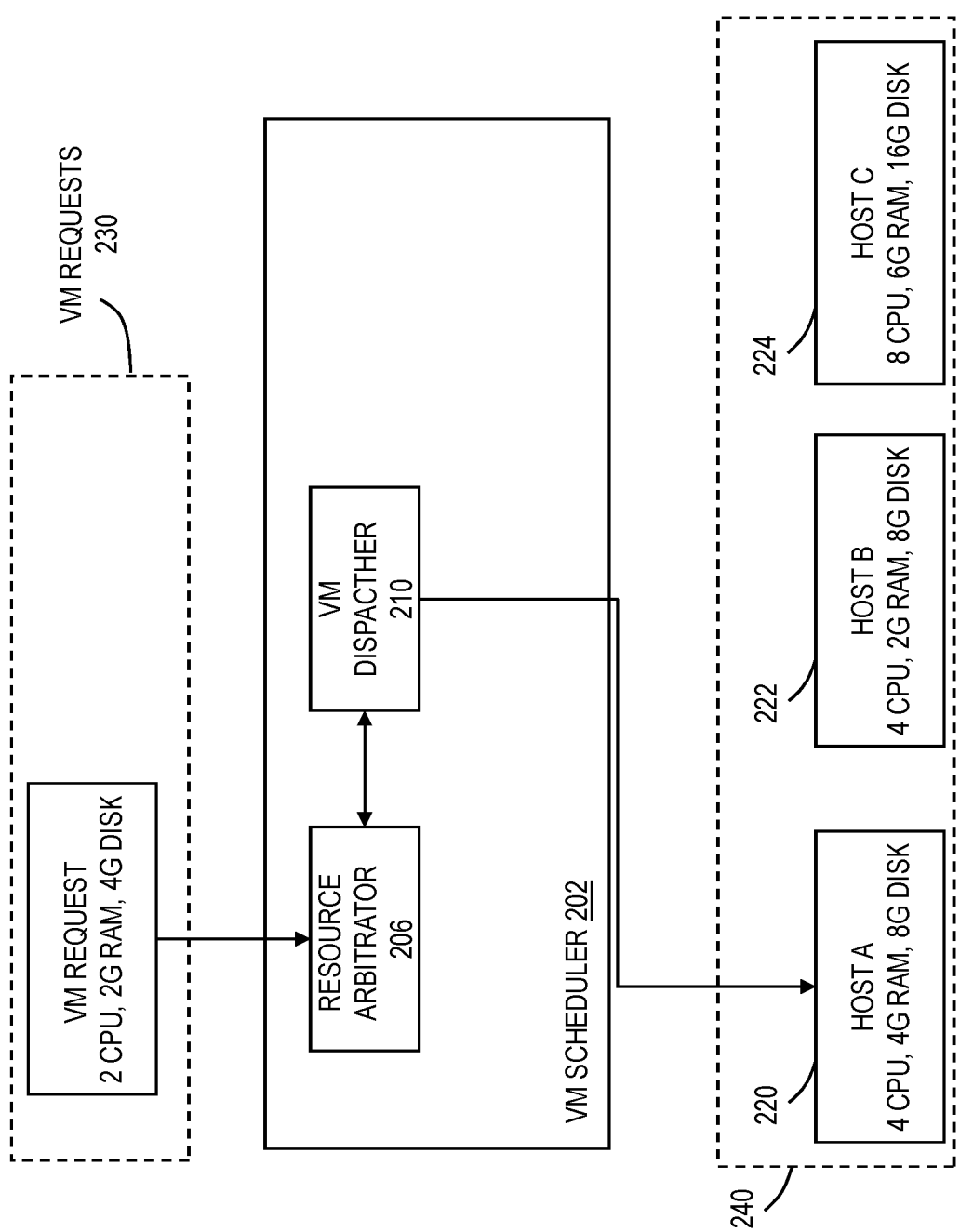
FIG. 4 is a block diagram illustrating an example of scheduling virtual machines using the system in accordance with one or more embodiments of the present invention.

FIG. 4 is a block diagram of using system 200 for scheduling virtual machines in accordance with one or more embodiments of the present invention. It should be appreciated that an abbreviated view of system 200 is shown for conciseness, and system 200 includes all features discussed herein. FIG. 4 illustrates an example scenario using SVS 202 to dispatch a VM request which could be a combined VM request as discussed herein. In the example scenario of FIG. 4, SVS 202 receives VM request 230 which includes 2 CPU, 2G RAM, and 4G DISK. RT 206 is configured to use the global optimum method to choose the host machine from host machines 240 which is the best fit host, and one method is to use a minimal variance algorithm. In one or more embodiments, RT 206 is configured to determine r1=vCPU/CPU, r2=vRAM/RAM, r3=vDISK/DISK, r=(r1+r2+r3)/3, wherein "v" in front of the resource such a vCPU denotes the requested resource amount from a VM request, while no "v" in front of the resource denotes the available resource amount of a host machine. Using resources of Host A and requested resources of VM request, r1=2/4=1/2, r2=2/4=1/2, and r3=4/8=1/2. Therefore, r=(1/2+1/2+1/2)/3=1.5/3=0.5=1/2. Also, RT 206 is configured to determine the variance, which should ideally be 0 (i.e., the lower, the better), using $VAR(r1, r2, r3) = \sqrt{[(r1-r)^2+(r2-r)^2+(r3-r)^2]/3}$. In FIG. 4, RT 206 is configured to select Host A as the best fit host because Host A's VAR(r1, r2, r3) is the ideal value 0 and because 2 CPU, 2G RAM, and 4G DISK are available after deploying/instantiating the VM request on Host A, which leaves no resource fragment and provides resources for a future baseline VM request.

Although Host B can support VM request in FIG. 4, RT 206 is configured to determine that Host B is not better than Host A because Host B would result in a remainder of 2 CPU, 0 RAM, 4G DISK, and this is a resource fragment because there is no available RAM even though there other types of resources are available (i.e., 2 CPU and 4G DISK) on Host B; by having 0 RAM, Host B could not support any future baseline VM request which require some amount of CPU, RAM, DISK. Although Host C can support VM request in FIG. 4, RT 206 is configured to determine that Host C is not better than Host A because Host C has a larger variance or difference between the requested resources of VM request and available resource on Host C as compared to Host A. Accordingly, RT 206 determines that available resources of Host C can be saved for a larger VM request that could not be accommodated by Host A, thereby allowing Host C to be more efficiently used in the future.

Additionally, one or more embodiments can utilize RR 208 to find a suitable host group to reclaim resources from host machines as part of VM migration, which can improve the resource usage after VMs have been deployed, e.g., when resources of hosts have been changed intentionally or unintentionally. Reclaiming resources involves migrating one or more VMs from one host machine to another host machine. Host machines can be running various VMs after executing VM requests. Although it may be difficult to determine which hosts are suitable for resource reclaim in a typical system, RR 208 determines host machines using best resource complementation through the minimal variance of the resources sum ratio for host machines according to one or more embodiments. Using an example that there are three host machines and three resource types, some details of the following are discussed for CPU but also apply by analogy to each/more resource(s) (such as, e.g., RAM, DISK, etc.) and more host machines. For CPU, RR 208 determines var_avail_cpu=VAR(host1_avail_cpu, host2_avail_cpu, host3_avail_cpu). Here, host1_avail_cpu is the available CPU number in Host 1, host2_avail_cpu is the available CPU number in Host 2, and so on, and var_avail_cpu is the minimal variance of the available CPU numbers of Host 1, Host 2 and Host 3. For CPU, RR 208 determines avail_cpu_sum=host1_avail_cpu+host2_avail_cpu+host3_avail_cpu. Additionally, RR 208 determines var_sum_avail_cpu_ratio=var_avail_cpu/avail_cpu_sum.

RR 208 measures all types of resources, e.g., CPU, RAM, DISK, during its reclaim process instead of just one type of resource as one VM request needs all of them. Particularly, RR 208 measures all types of resources (e.g. CPU, RAM, DISK) through minimal variance to obtain a best reclaim or best reclaim strategy. Minimal variance among the different resources (e.g. CPU, RAM, DISK) can guarantee the resources will be reclaimed with a best amount to fulfill the (future) VM requests. However, the different types of resources (CPU, RAM, DISK) cannot be measured together directly through minimal variance because they are different types of resources and their amount and units are completely different, e.g., 4 CPU, 8G RAM, 32G DISK. As such, a direct minimal variance among them would not be useful. However, RR 208 is configured to use var_sum_avail_cpu_ratio, var_sum_avail_ram_ratio, and var_sum_avail_disk_ratio to unify the minimal variances among (i.e., find a common denominator for properly comparing) the different resources (CPU, RAM, DISK); this accomplished by removing the unit and amount gaps/differences for the different resources so that the different types of resources (CPU, RAM, DISK) can be measured together, and so that the minimal variance of var_sum_avail_cpu_ratio, var_sum_avail_ram_ratio, and var_sum_avail_disk_ratio is meaningful and can be precisely used to determine if a best resource reclaim can be achieved among Host1, Host2 and Host 3. After RR 208 determines the variance for each type of resource, RR 208 determines MIN VAR(var_sum_avail_cpu_ratio, var_sum_avail_ram_ratio, var_sum_avail_disk_ratio), where the ideal value is 0, and the lower the result, the better the reclaim (of resources). In one or more embodiments, a threshold of the minimal variance can be defined for RR 208 to determine if reclaiming among Host 1, Host 2, and Host 3 is valuable, and/or RR 208 can group the host machines in different sets and choose the set with the minimal (lowest) value for minimal variances. In one or more embodiments, reclaiming by RR 208 can be done recursively or in parallel for different groups of host machines. For example, if there are host 1 of x available CPU only, host 2 of y available RAM only, and host 3 of ty (t>0 is a constant rational number) available RAM only. The RR 208 can determine that they (i.e., hosts 1, 2, and 3) are not a suitable host group for resource reclaim because no matter how you migrate VMs among them, the available DISK is always 0. Accordingly, this method of RR 208 can identify them as an unsuitable host group: $\text{var\_avail\_cpu} = \sqrt{2/3} \times (x)$, $\text{var\_avail\_ram} = \sqrt{[(1+t)^2+(2-t)^2+(2t-1)^2] \times (y/3)} = \sqrt{6t^2-6t+6} \times (y/3)$, $\text{var\_avail\_disk}=0$, $\text{var\_sum\_avail\_cpu\_ratio} = \sqrt{2/3} \times (x/x) =$, $\sqrt{2/3}$, $\text{var\_sum\_avail\_ram\_ratio} = (\sqrt{6t^2-6t+6})/3$, $\text{var\_sum\_avail\_disk\_ratio}=0$, eventually RR 208 calculates the minimal variance of CPU, RAM, DISK through VAR(var_sum_avail_cpu_ratio, var_sum_avail_ram_ratio, var_sum_avail_disk_ratio)=val>0. In another case, if there are host 1 of x available CPU only, host 2 of y available RAM only, and host 3 of z available DISK only, then $\text{var\_avail\_cpu}=\sqrt{2/3} \times (x)$, $\text{var\_avail\_ram}=\sqrt{2/3} \times (y)$, $\text{var\_avail\_disk}=\sqrt{2/3} \times (z)$, var_sum_avail_cpu_ratio=var_sum_avail_ram_ratio=var_sum_avail_disk_ratio=$\sqrt{2/3}$, and VAR(var_sum_avail_cpu_ratio, var_sum_avail_ram_ratio, var_sum_avail_disk_ratio)= 0; this is an ideal value and host 1, host 2 and host 3 are now a suitable host group for resources reclaim. RR 208 checks if host machine 1, 2, and 3 can benefit from migrating VMs among them first through the calculation on the VMs' resources and hosts' resources before actually performing migration.

Figure 5:
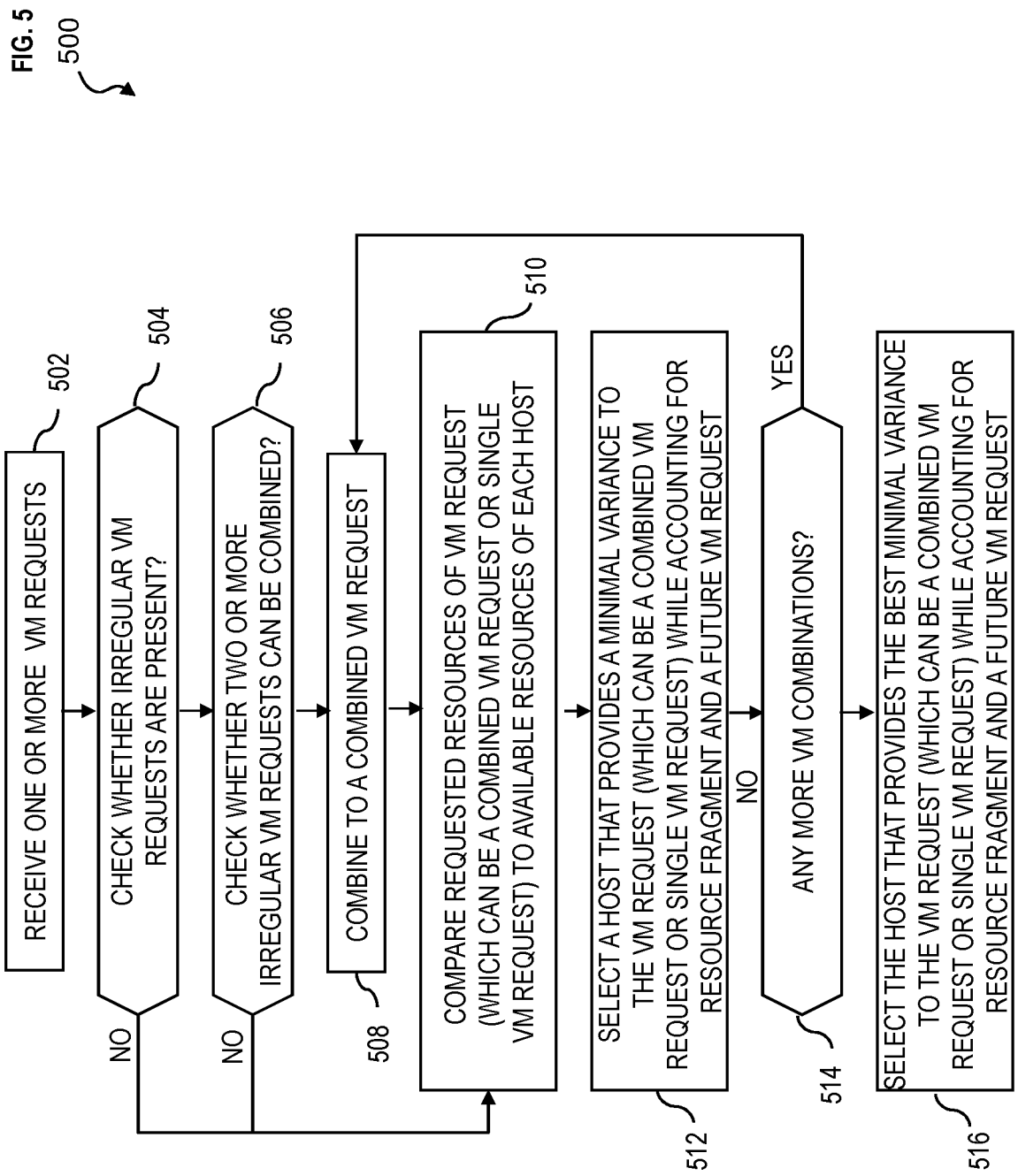
FIG. 5 is flow diagram of a computer-implemented method for allocating/scheduling virtual machine requests on host machines while avoiding resource fragment and accounting for a potential future virtual machine request according to one or more embodiments.

FIG. 5 illustrates flow diagram of a method 500 for allocating/scheduling VM requests efficiently on host machines while avoiding resource fragment and accounting for a potential future VM request according to one or more embodiments. Method 500 may be implemented in conjunction with any appropriate computer system, such as computer system 100 of FIG. 1. Embodiments of method 500 may be implemented in software 111 and may operate on data stored in mass storage 110 and/or system memory 103.

At block 502, SVS 202 is configured to receive one or more VM requests such as VM requests 230. At block 504, SVS 202 is configured to check whether one or more irregular VM request are present in VM requests 230. If no irregular VM requests are present, flow proceeds to block 510. If irregular VM request are present, SVS 202 is configured to check whether the irregular VM requests can be combined at block 506. For example, SVS 202 can check whether the combined VM request exceeds the capacity of a host machine, and if so, the VM requests would not be combined in that specific combination and/or combined at all if there are nothing other combinations. If the irregular VM requests cannot be combined, flow proceeds to block 510. If the irregular VM requests can be combined, SVS 202 is configured to combine the irregular VM requests at block 508. There can be various combinations of VM requests and each combination can be checked. An individual VM request is to have all its requested resources on the same host machine.

At block 510, SVS 202 is configured to compare requested resources of the VM request (which can be a combined VM request and/or single VM request) to available resources of each host machine to find a minimum variance. There can be multiple host machines having available resources to fulfill. At block 512, SVS 202 is configured to select a candidate host machine that provides a minimal variance to the VM request (which can be a combined VM request or single VM request) while avoiding (and/or minimizing) resource fragment and accounting for available resources to remain on the host machine to fulfill a future VM request (e.g., a future baseline VM request). If allocating the VM request will result in the candidate host machine not having enough available resources of all types to fulfill a future baseline VM request, SVS 202 is configured to select another candidate host machine. Also, if allocating the VM request will result in the candidate host machine having no available resource of one type (e.g., no CPU) remaining while having one or more types of another resource remaining, SVS 202 is configured to select another candidate host machine.

At block 514, SVS 202 is configured to check whether there are any more available VM request combinations. If there are more combinations available, flow proceeds to block 508. If there are no more combinations, SVS 202 is configured to select the candidate host machine that provides the best minimal variance to the VM request (which can be a combined VM request or single VM request) while avoiding (and/or minimizing) resource fragment and accounting for available resources to remain on the host machine to fulfill a future VM request (e.g., a future baseline VM request) at block 516. The best fit or best minimal variance is a host machine and VM request combination that will completely utilize the available resources of the host machine such that no available resources remain for any type of resource.

Figure 6:
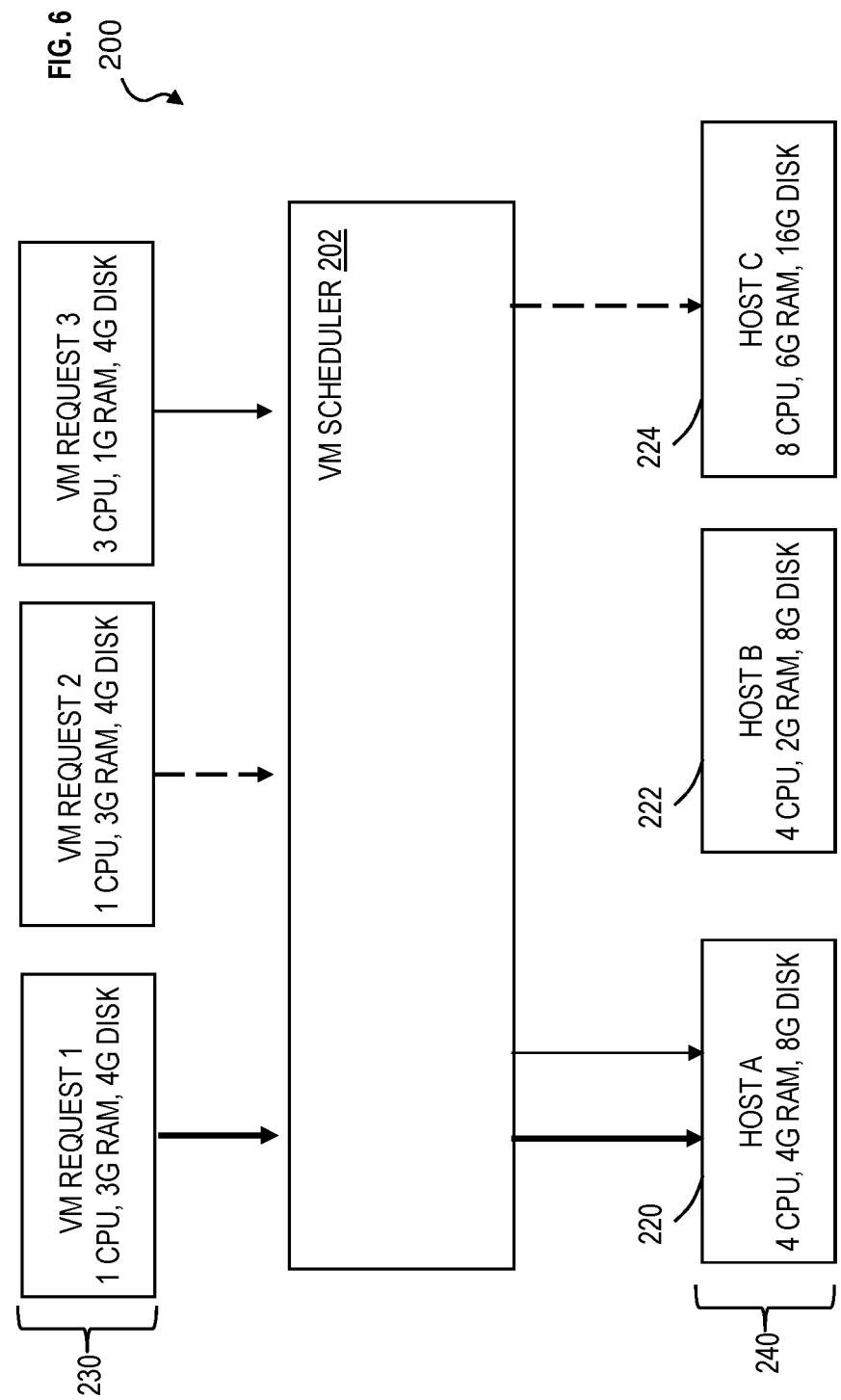
FIG. 6 is a block diagram illustrating an example of scheduling virtual machines using the system in accordance with one or more embodiments of the present invention.
Figure 7:
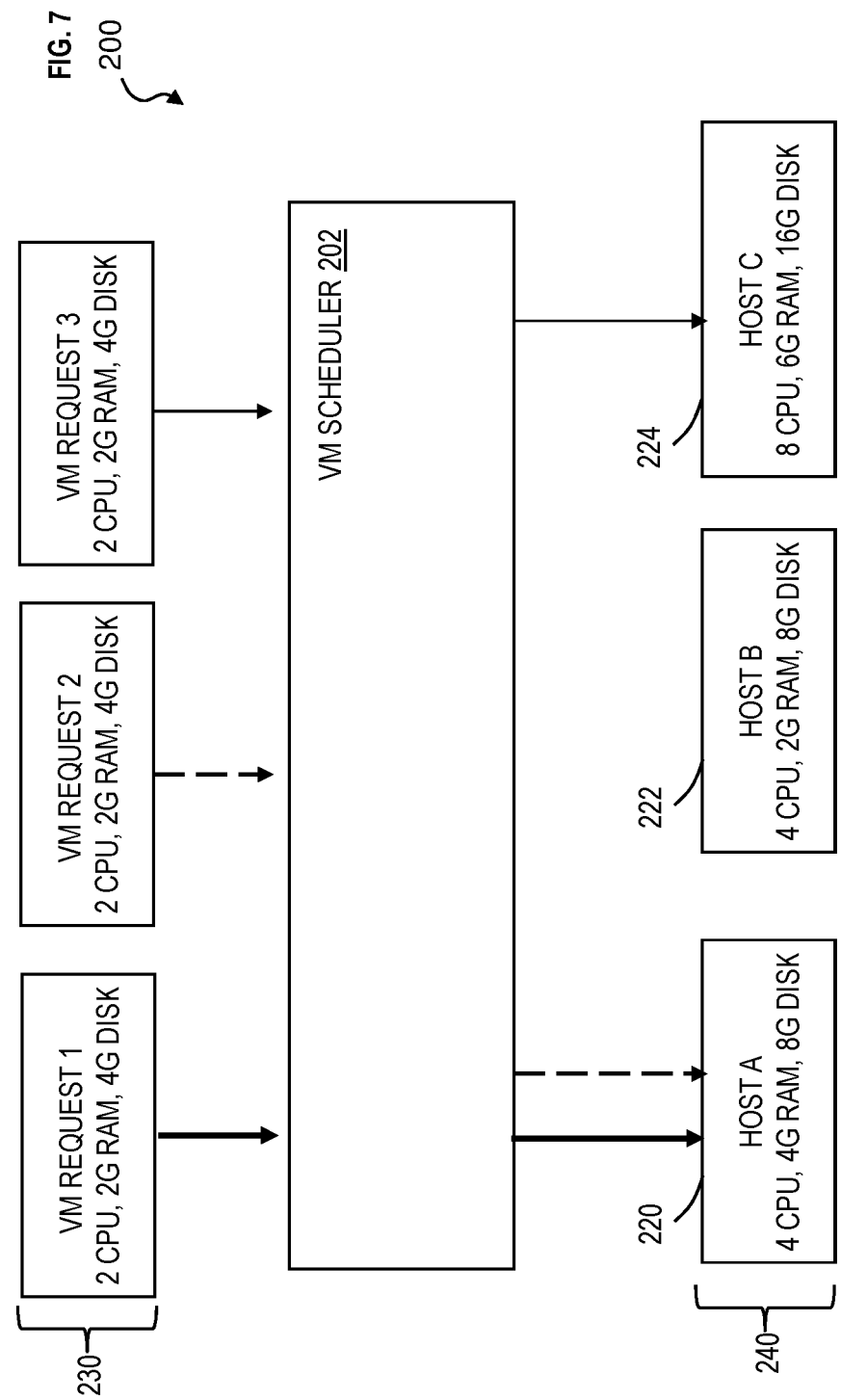
FIG. 7 is a block diagram illustrating an example of scheduling virtual machines using the system in accordance with one or more embodiments of the present invention.
Figure 8:
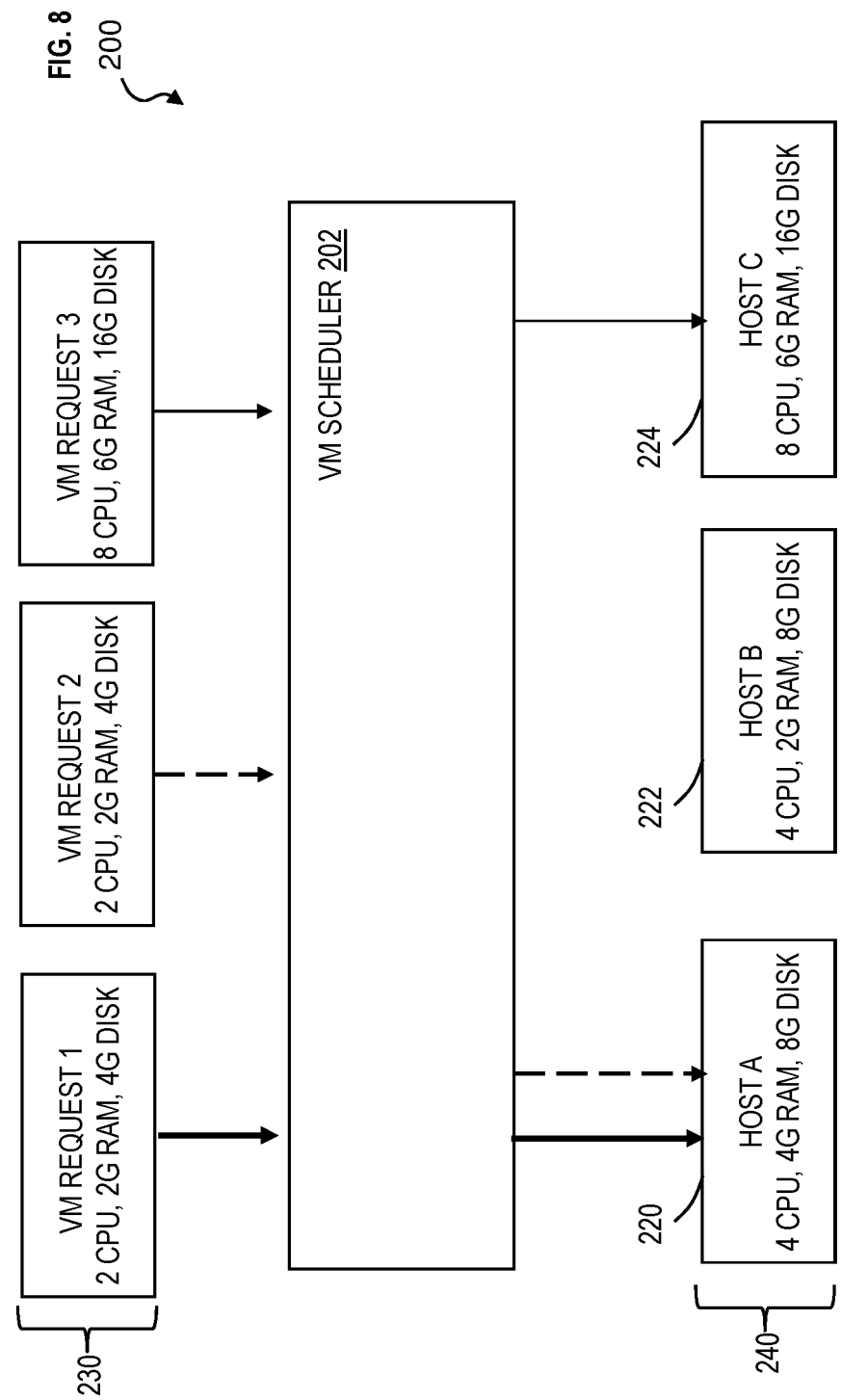
FIG. 8 is a block diagram illustrating an example of scheduling virtual machines using the system in accordance with one or more embodiments of the present invention.

Additional example scenarios are depicted in FIGS. 6, 7, and 8 for combining VM requests (e.g., which can be regular VM requests and/or irregular VM requests) and using global optimum of minimal variance for allocation on host machines. FIGS. 6, 7, and 8 illustrate an abbreviated view of system 200 for conciseness, and it should be appreciated that system 200 includes all features discussed herein. Turning to FIG. 6, a block diagram depicts using system 200 for scheduling virtual machines in accordance with one or more embodiments of the present invention. In FIG. 6, three VM requests 230 are received by SVS 202. SVS 202 determines that VM requests 1, 2, and 3 are each irregular VM request. Although a greedy search algorithm may typically schedule VM request 1 and VM request 2 on Host C because Host C has the largest available resources of 8 CPU, 6G RAM, and 16G DISK, this would cause a more irregular request to Host C and result in a large resource fragment and waste; in such a case, there would be a resource fragment of 6 CPU and 8G DISK (with 0 RAM) on Host C which cannot fulfill VM request 3 and any future baseline VM request (which would require some amount of CPU, RAM, and DISK). However, one or more embodiments using SVS 202 can avoid the resource fragment. As seen in FIG. 6, SVS 202 is configured to combine VM request 1 and VM request 3 because the requested resources have a minimal variance to available resources in Host A (i.e., the combination of VM requests 1 and 3 completely utilizes the available resources of Host A, resulting in 0 resource fragment which means 0 waste) according to one or more embodiments. Additionally, VM request 2 is placed on Host C resulting in no resource fragment and leaving resources of each type available to meet a future baseline VM request.

FIG. 7 is a block diagram of using system 200 for scheduling virtual machines in accordance with one or more embodiments of the present invention. In FIG. 7, three VM requests 230 are received by SVS 202. SVS 202 determines that VM requests 1, 2, and 3 are each regular VM request in this example scenario. Although a typical scheduler may choose to group the same regular VM requests 1, 2, and 3 (i.e., having the same requested resources, e.g., 2 CPU, 2G RAM, 4G DISK) in an equivalent set and send (using a greedy search algorithm) the equivalent set to the maximum resource Host C because Host C has the largest available resources of 8 CPU, 6G RAM, and 16G DISK, this would result in a resource fragment (i.e., no capacity for one type of resource, e.g., RAM) and waste of 2 CPU and 4G DISK on Host C. However, one or more embodiments using SVS 202 can avoid the resource fragment and waste. According to one or more embodiments, SVS 202 is configured to combine VM request 1 and VM request 2 because the requested resources have a minimal variance to available resources in Host A (i.e., the combination of VM requests 1 and 2 completely utilizes the available resources of Host A in this case, resulting in 0 resource fragment which means 0 waste). Additionally, VM request 3 is placed on Host C which results in no resource fragment and leaves resources of each type available to meet a baseline future VM request.

FIG. 8 is a block diagram of using system 200 for scheduling virtual machines in accordance with one or more embodiments of the present invention. In FIG. 8, three VM requests 230 are received by SVS 202. SVS 202 can determine that VM requests 1, 2, and 3 are each regular, each irregular, and/or combination of regular and irregular VM requests. Although a typical scheduler may choose to always schedule VM requests 1, 2, and 3 to the weightiest or largest host, e.g., Host C, which has the largest resources, this will result in VM request 3 failing for lack of resources. However, one or more embodiments using SVS 202 can avoid causing VM request 3 to fail which requests amounts of CPU, RAM, and DISK that can only be met by Host C. According to one or more embodiments, SVS 202 is configured to schedule each VM request 1, VM request 2, and VM request 3 to take a global optimum approach by fining the most-matched host having a minimal variance such that more requests can be satisfied and no resource fragment results. Because SVS 202 takes a global optimum approach of comparing requested resources of VM requests 1, 2, and 3 against resources of each Host A, B, and C respectively, SVS 202 determines that the variance is too large for Host C with respect to VM requests 1 and 2 and determines that a resource fragment would result for Host B with respect to VM requests 1 and 2. SVS 202 determines that resources of Host A fulfills VM requests 1 and 2 with no resource fragment and no waste, thereby leaving the larger VM request 3 for Host C having the greatest resources. In FIG. 8, each VM request 1, 2, and 3 is matched to the host for the best fit with minimal variance and no waste.

If there is a situation where a resource fragment and/or waste are unavoidable, SVS 202 is configured to match VM requests and hosts to minimize the amount of waste and/or have the smallest resource fragment.

The techniques and systems discussed herein provide various technical benefits. In accordance with one or more embodiments, the maximum amount of a host's resources is used by the VMs instead of resulting in a fragment resource and/or waste. Techniques discussed herein are transparent to the administrator and provide computing costs saving in a cloud center. Techniques discussed herein are flexible thereby meeting different scenarios by setting different key resources and can be applied to any type of virtual resource scheduling such as, for example, container, logical partition (LPAR), etc.

Figure 9:
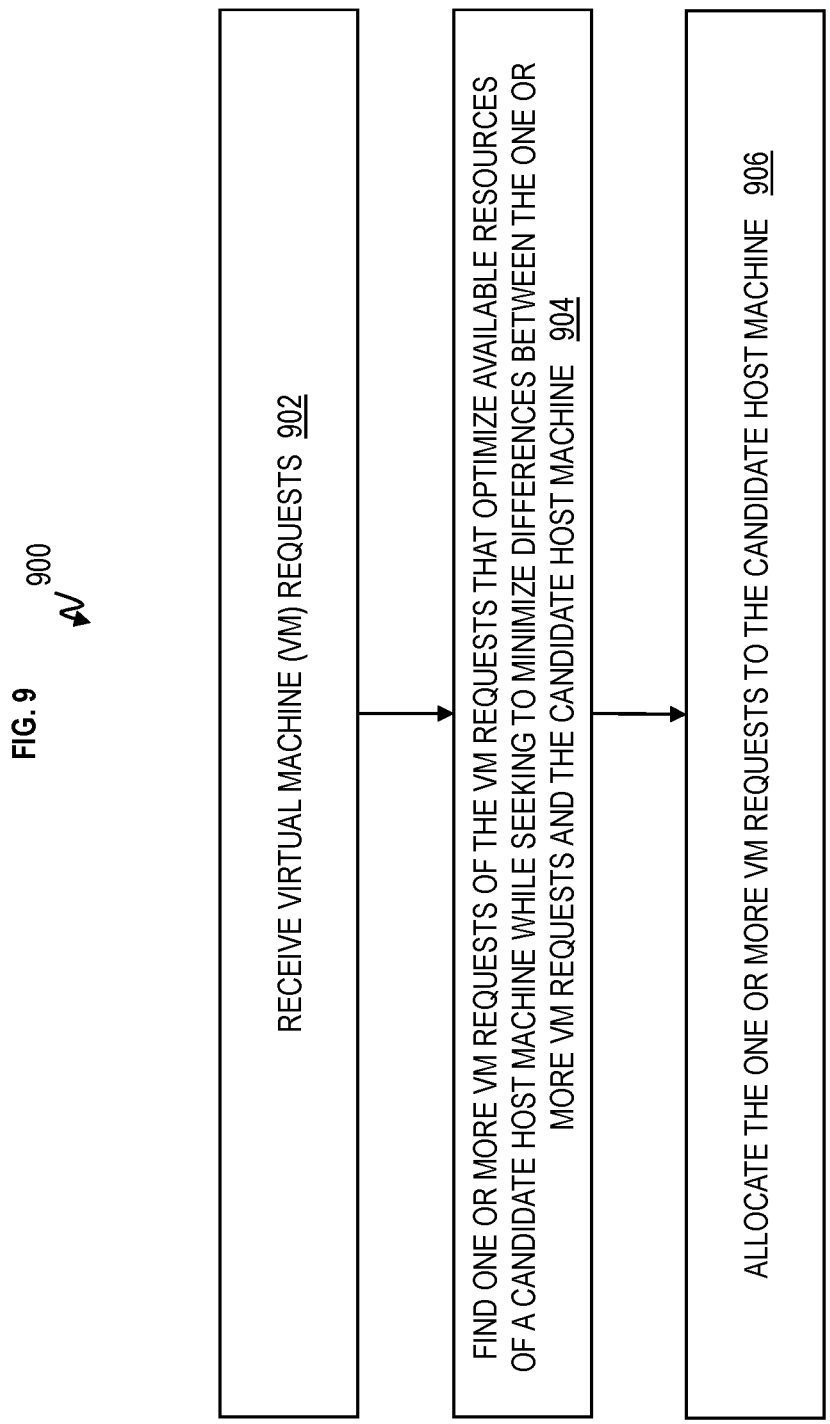
FIG. 9 is a flow diagram of a computer-implemented method for allocating/scheduling virtual machine requests in accordance with one or more embodiments of the present invention.

FIG. 9 is a flow diagram of computer-implemented method 900 for scheduling VM requests on host machines according to one or more embodiments. At block 902, SVS 202 is configured to receive virtual machine (VM) requests 230. At block 904, SVS 202 is configured to find one or more VM requests of the VM requests 230 that optimize available resources of a candidate host machine (e.g., one of host machines 240) while seeking to minimize differences between the one or more VM requests and the candidate host machine. At block 906, SVS 202 is configured to allocate (e.g., deploy, run, and/o execute) the one or more VM requests to the candidate host machine.

Further, the finding is configured to match/fulfill requested resources (e.g., CPU, RAM, DISK) of the one or more VM requests with the available resources (e.g., CPU, RAM, DISK) of the candidate host machine (e.g., one or host machines 240) while ensuring that any unused resources in the candidate host machine satisfy a possibility of allocating at least one future VM request to the candidate host machine. Future requested resources of the at least one future VM request are based on the historical profile 302 (e.g., based on a baseline future VM request stored in historical profile 302). Additionally, the finding is configured to match/fulfill requested resources of the one or more VM requests with the available resources of the candidate host machine while ensuring that either no unused resources remain on the candidate host machine (i.e., each type of resource is completely utilized to capacity on the candidate host machine) and/or that any unused resources in the candidate host machine satisfy a possibility of allocating at least one future VM request (e.g., having each type of resource available (e.g., CPU, RAM, DISK) to the candidate host machine to meet/fulfill the possibility of a future VM request after allocating the one or more VM requests). The finding comprises using a minimal variance to find a best matched host machine from a plurality of candidate host machines (e.g., host machines 240), the best matched host machine being the candidate host machine having the available resources capable of meeting the one or more VM requests with the minimal variance.

The SVS 202 is configured to determine irregular VM requests in the VM requests based on the historical profile 302 (e.g. by the irregular VM request having a difference/variance greater than the requested resources of the baseline VM request), and find a combination of the irregular VM requests that optimizes available resources of a potential host machine while seeking to minimize differences between the combination of the irregular VM requests and the potential host machine. Also, the SVS 202 is configured to allocate the combination of the irregular VM requests to the potential host machine. The finding is configured match requested resources of the combination of the irregular VM requests with the available resources of the potential host machine while ensuring that any unused resources in the potential host machine satisfy a possibility of allocating the at least one future VM request (i.e., no resource fragment) to the potential host machine. The requested resources of an irregular VM request in the irregular VM requests differ from an average requested resources associated with a baseline VM request (i.e., baseline VM request in historical profile 302).

The SVS 202 is configured to determine available resource ratios for types of available resources in a group of two or more host machines, determine a minimal variance for the available resource ratios for the group, and determine whether or not to migrate one or more VMs in the group based on the minimal variance. The SVS 202 is configured to migrate VMs from one or more of the host machines in the group to one or more other host machines in the group when the minimal variance is less than a threshold value. The finding and the allocating enable unilaterally provisioning computing capabilities for the VM requests.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
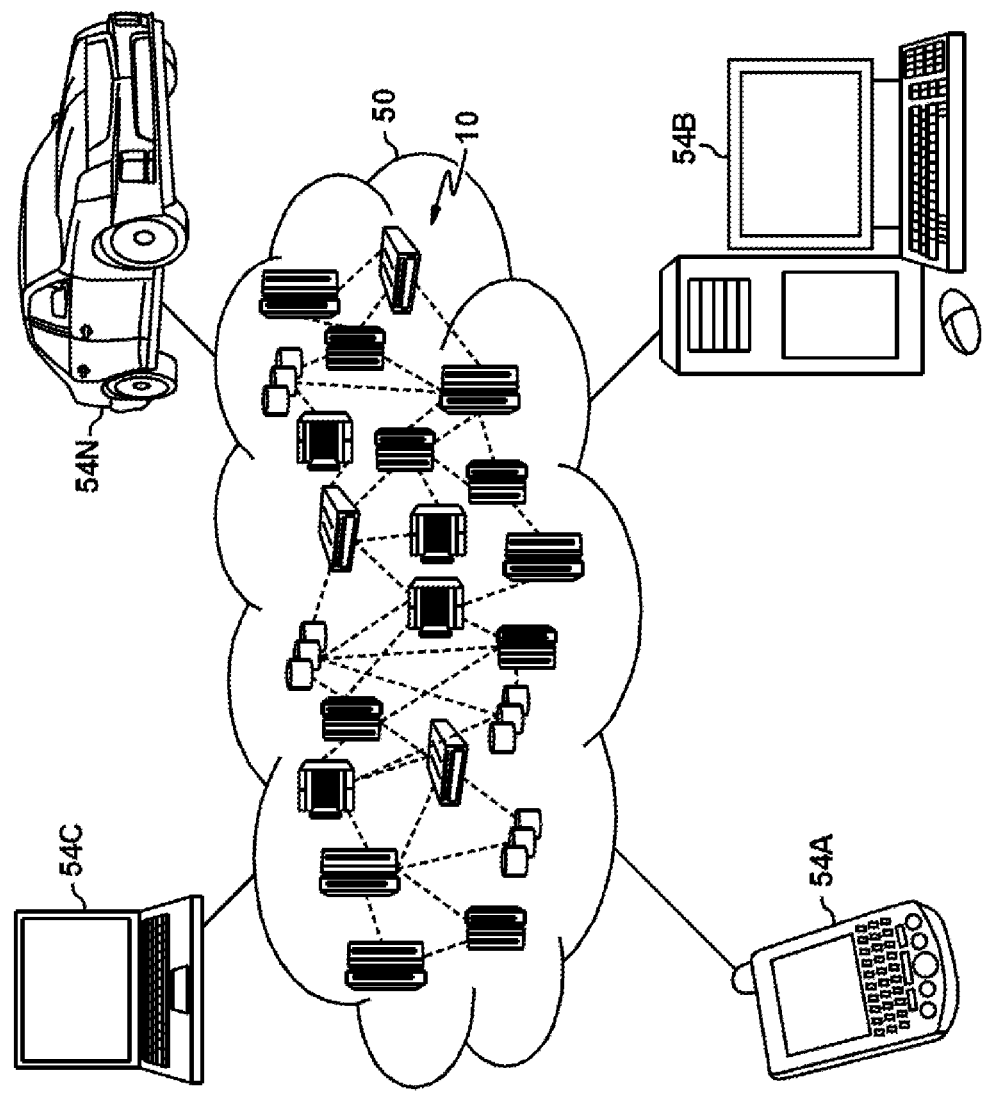
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
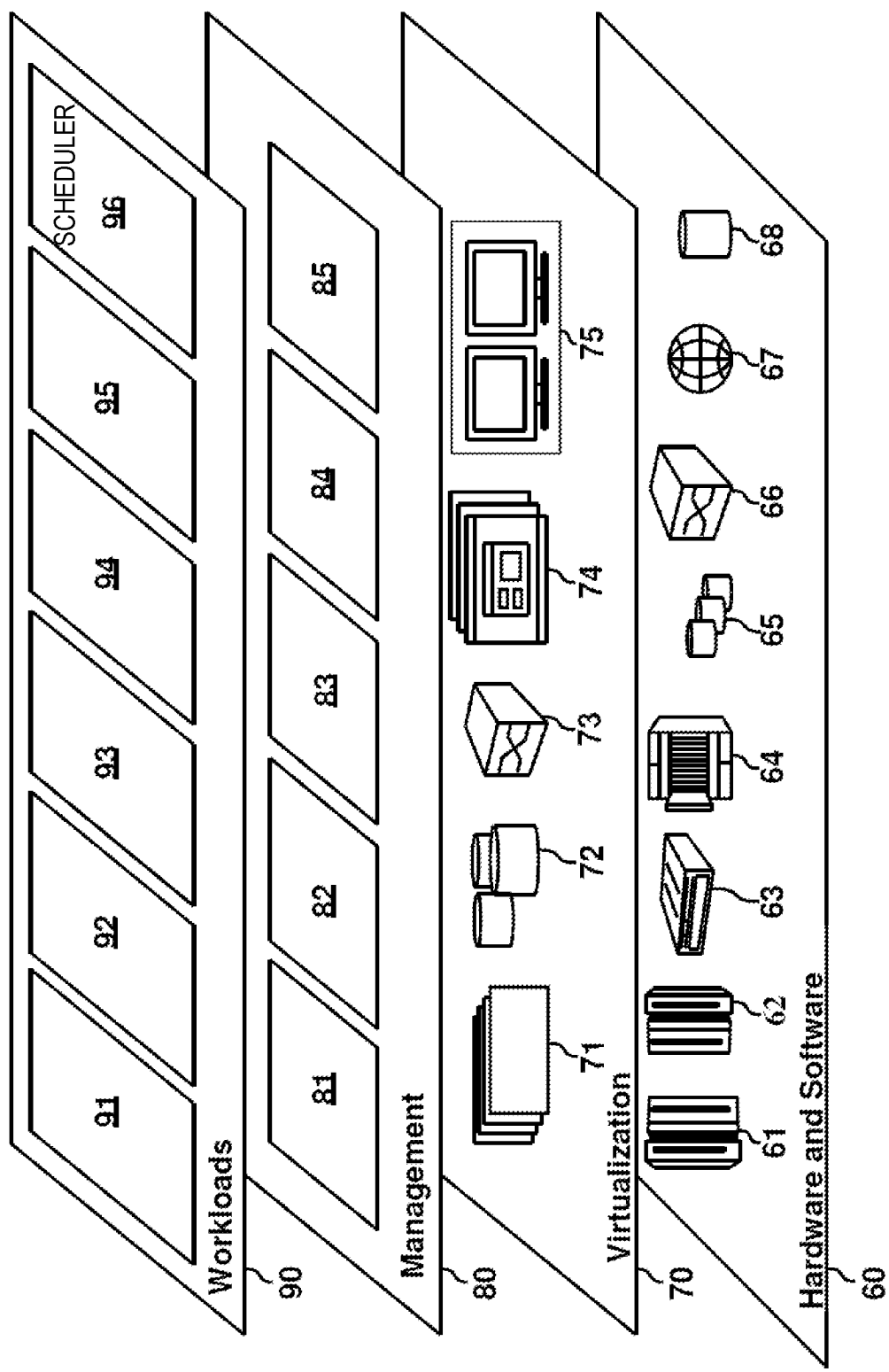
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and one or more software and/or hardware components of SVS 202 can be implemented in workloads and functions 96. Also, SVS 202 can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving virtual machine (VM) requests;
establishing a baseline resources that fall within a variance limit;
determining at least one irregular VM request in the VM requests, responsive to comparing the at least one irregular VM request to a baseline VM request, the baseline VM request being associated with the baseline resources;
finding a combination of the at least one irregular VM request and one or more VM requests of the VM requests that optimizes available resources of a candidate host machine to combine requested resources of the at least one irregular VM request and the one or more VM requests; and
allocating the at least one irregular VM request and the one or more VM requests to the candidate host machine.

2. The computer-implemented method of claim 1, wherein the finding is configured to match the combined requested resources of the at least one irregular VM request and the one or more VM requests with the available resources of the candidate host machine while ensuring that any unused resources in the candidate host machine satisfy a possibility of allocating at least one future VM request to the candidate host machine.

3. The computer-implemented method of claim 2, wherein future requested resources of the at least one future VM request are based on the baseline VM request.

4. The computer-implemented method of claim 1, wherein the finding is configured to match the combined requested resources with the available resources of the candidate host machine while ensuring that either no unused resources remain on the candidate host machine or that any unused resources in the candidate host machine satisfy a possibility of allocating at least one future VM request to the candidate host machine.

5. The computer-implemented method of claim 1, wherein the finding comprises using a global optimization to find a best matched host machine from a plurality of candidate host machines.

6. The computer-implemented method of claim 1, further comprising determining irregular VM requests in the VM requests based on a comparison to the baseline VM request;
finding a combination of the irregular VM requests that optimizes available resources of a potential host machine and requested resources of the irregular VM requests; and
allocating the combination of the irregular VM requests to the potential host machine.

7. The computer-implemented method of claim 6, wherein the finding is configured to match the requested resources of the combination of the irregular VM requests with the available resources of the potential host machine while ensuring that any unused resources in the potential host machine satisfy a possibility of allocating at least one future VM request to the potential host machine; and
wherein the requested resources of an irregular VM request in the irregular VM requests differ from baseline requested resources associated with the baseline VM request.

8. The computer-implemented method of claim 1, further comprising determining available resource ratios for types of available resources in a group of two or more host machines;
determining differences among the available resource ratios for the group; and
determining whether or not to migrate one or more VMs in the group based on the differences.

9. A system comprising:
a memory having computer readable instructions; and
one or more processors for executing the computer readable instructions, the computer readable instructions controlling the one or more processors to perform operations comprising:
receiving virtual machine (VM) requests;
establishing a baseline resources that fall within a variance limit;
determining at least one irregular VM request in the VM requests, responsive to comparing the at least one irregular VM request to a baseline VM request, the baseline VM request being associated with the baseline resources;
finding a combination of the at least one irregular VM request and one or more VM requests of the VM requests that optimizes available resources of a candidate host machine to combine requested resources of the at least one irregular VM request and the one or more VM requests; and
allocating the at least one irregular VM request and the one or more VM requests to the candidate host machine.

10. The system of claim 9, wherein the finding is configured to match the combined requested resources of the at least one irregular VM request and the one or more VM requests with the available resources of the candidate host machine while ensuring that any unused resources in the candidate host machine satisfy a possibility of allocating at least one future VM request to the candidate host machine.

11. The system of claim 10, wherein future requested resources of the at least one future VM request are based on the baseline VM request.

12. The system of claim 9, wherein the finding is configured to match the combined requested resources with the available resources of the candidate host machine while ensuring that either no unused resources remain on the candidate host machine or that any unused resources in the candidate host machine satisfy a possibility of allocating at least one future VM request to the candidate host machine.

13. The system of claim 9, wherein the finding comprises using a global optimization to find a best matched host machine from a plurality of candidate host machines.

14. The system of claim 9, further comprising determining irregular VM requests in the VM requests based on a historical profilea comparison to the baseline VM request;
finding a combination of the irregular VM requests that optimizes available resources of a potential host machine while seeking to minimize differences between the combination and requested resources of the irregular VM requests and the potential host machine; and allocating the combination of the irregular VM requests to the potential host machine.

15. The system of claim 14, wherein the finding is configured to match the requested resources of the combination of the irregular VM requests with the available resources of the potential host machine while ensuring that any unused resources in the potential host machine satisfy a possibility of allocating the at least one future VM request to the potential host machine; and wherein the requested resources of an irregular VM request in the irregular VM requests differ from baseline requested resources associated with the baseline VM request.

16. The system of claim 9, further comprising determining available resource ratios for types of available resources in a group of two or more host machines;

determining differences among the available resource ratios for the group; and determining whether or not to migrate one or more VMs in the group based on the differences.

17. A computer program product comprising a computer readable storage medium having program instructions embodied therewith, the program instructions executable by a processor to cause the processor to perform operations comprising:

receiving virtual machine (VM) requests;

establishing a baseline resources that fall within a variance limit;

determining at least one irregular VM request in the VM requests, responsive to comparing the at least one irregular VM request to a baseline VM request, the baseline VM request being associated with the baseline resources;

finding a combination of the at least one irregular VM request and one or more VM requests of the VM requests that optimizes available resources of a candidate host machine while accounting for possible allocation of a least one future VM request to the candidate host machine based on the baseline VM request; and allocating the at least one irregular VM request and the one or more VM requests to the candidate host machine.

18. The computer program product of claim 17, wherein the finding is configured to match combined requested resources of the at least one irregular VM request and the one or more VM requests with the available resources of the candidate host machine while ensuring that any unused resources in the candidate host machine satisfy a possibility of the at least one future VM request.

* * * * *